US012589832B2

(12) United States Patent
  Martel et al.

(10) Patent No.: US 12,589,832 B2
(45) Date of Patent: Mar. 31, 2026

(54) SEAT ATTACHMENT FOR ELECTRIC RECREATIONAL VEHICLE

(71) Applicant: TAIGA MOTORS INC., Lasalle (CA)

(72) Inventors: Philippe Martel, St-Hyacinthe (CA); Paul Dowden, Lindsay (CA); Jérôme Lefrancois, Sherbrooke (CA); Patrick Bernier, Montreal (CA)

(73) Assignee: TAIGA MOTORS INC., Lasalle (CA)

( * ) Notice: Subject to any disclaimer, the term of this patent is extended or adjusted under 35 U.S.C. 154(b) by 452 days.

(21) Appl. No.: 18/221,511

(22) Filed: Jul. 13, 2023

(65) Prior Publication Data

US 2024/0017794 A1     Jan. 18, 2024

Related U.S. Application Data

(60) Provisional application No. 63/370,969, filed on Aug. 10, 2022, provisional application No. 63/368,679, filed on Jul. 18, 2022.

(51) Int. Cl.
  *B62M 27/02*      (2006.01)
  *B62J 43/16*      (2020.01)
  *B60L 50/60*      (2019.01)

(52) U.S. Cl.
  CPC ............... *B62M 27/02* (2013.01); *B62J 43/16* (2020.02); *B60L 50/66* (2019.02)

(58) Field of Classification Search
  CPC ........... B62M 27/02; B62J 43/10; B62J 43/16
  See application file for complete search history.

(56) References Cited

U.S. PATENT DOCUMENTS 7,469,764 B2   12/2008   Girouard
8,919,481 B2   12/2014   Matsuda
      (Continued)

FOREIGN PATENT DOCUMENTS

CA      3156771 A1      5/2021
CA      3123823 A1      1/2022
      (Continued)

OTHER PUBLICATIONS

Per Trostemo, "The First Electric Snowmobile", Green Solutions from Sweden, pp. 100-101, Nov. 18, 2015.
      (Continued)

*Primary Examiner* — Kevin Hurley
(74) *Attorney, Agent, or Firm* — Norton Rose Fulbright Canada LLP

(57)               ABSTRACT

An electric recreational vehicle, has: a frame extending along a longitudinal axis; an electric motor mounted to the frame; a battery pack mounted to the frame and disposed at least partially rearward of the electric motor relative to the longitudinal axis, the battery pack including one or more battery modules operatively connected to the electric motor for supplying electrical energy to the electric motor, a battery enclosure containing the one or more battery modules, and at least one structural member located within the battery enclosure and delimiting at least one module-receiving section, the one or more battery modules located within the at least one module-receiving section; and a seat disposed over the battery pack and secured to the at least one structural member of the battery pack, a load transmission path extending between the frame and the seat through the at least one structural member of the battery pack.

21 Claims, 10 Drawing Sheets

(56) References Cited

U.S. PATENT DOCUMENTS

| | | | | |
|---|---|---|---|---|
| 9,016,080 | B2 | 4/2015 | Brodie et al. | |
| 9,533,544 | B2 | 1/2017 | Johnston | |
| 9,545,968 | B2 * | 1/2017 | Miyashiro | B62J 43/28 |
| 10,406,910 | B2 | 9/2019 | Vezina | |
| 10,766,573 | B2 | 9/2020 | Vezina | |
| 11,319,013 | B2 * | 5/2022 | Ueno | B62M 7/02 |
| 11,358,679 | B2 | 6/2022 | Haavikko | |
| 11,597,473 | B2 | 3/2023 | Matsushita | |
| 12,113,188 | B2 * | 10/2024 | Takeuchi | H01M 50/242 |
| 12,300,839 | B2 * | 5/2025 | Connors | B60K 1/00 |
| 12,391,336 | B2 * | 8/2025 | Bruneau | H01M 50/249 |
| 12,466,517 | B2 * | 11/2025 | Bruneau | B60K 1/04 |
| 2010/0025006 | A1 | 2/2010 | Zhou | |
| 2020/0140037 | A1 | 5/2020 | Haavikko et al. | |
| 2022/0009589 | A1 | 1/2022 | Matsushita | |
| 2022/0017181 | A1 | 1/2022 | Suzuki | |
| 2022/0063764 | A1 | 3/2022 | Matsushita | |
| 2022/0340044 | A1 | 10/2022 | Roebuck | |
| 2022/0411018 | A1 | 12/2022 | Vaisanen | |
| 2024/0343345 | A1 * | 10/2024 | Haavikko | B62J 43/16 |
| 2024/0383345 | A1 * | 11/2024 | Hu | B60L 50/64 |
| 2025/0065985 | A1 * | 2/2025 | Salfer | B62J 43/16 |
| 2025/0115331 | A1 * | 4/2025 | Delor | B62M 27/02 |

FOREIGN PATENT DOCUMENTS

| | | | | | |
|---|---|---|---|---|---|
| CA | 3127011 | A1 | 2/2022 | | |
| CA | 3130333 | A1 | 4/2022 | | |
| CA | 3155878 | A1 | 10/2022 | | |
| CA | 3124384 | C | 2/2023 | | |
| CN | 114655348 | A * | 6/2022 | | B62K 5/027 |
| WO | 2018215693 | A1 | 11/2018 | | |
| WO | WO-2019049109 | A1 * | 3/2019 | | B62D 55/07 |
| WO | 2021084520 | A2 | 5/2021 | | |
| WO | 2023073665 | A1 | 5/2023 | | |
| WO | 2023073673 | A1 | 5/2023 | | |
| WO | 2023079214 | A1 | 5/2023 | | |
| WO | 2023079215 | A1 | 5/2023 | | |
| WO | 2023129979 | A1 | 7/2023 | | |

OTHER PUBLICATIONS https://www.youtube.com/watch?v=raI8TY5DQk_4, published Apr. 23, 2010.

Mathew Brown, et al., "Review of Zero-Emission Utah State Snowmobile", Utah State University Electric Snowmobile Team, 13 pgs., Mar. 2007.

Marcia Goodrich, "Clean Snowmobile Challenge on Track for March", Published Jan. 24, 2012, https://www.mtu.edu/news/stories/2012/january/clean-snowmobile-challenge-track-for-march.html.

Snowbird: "Austrian Electric Snowmobile Reaches 120kph", Technologi Vehicles, Mar. 3, 2013. https://technologicvehicles.com/en/green-transportation-news/2340/snowbird-cette-motoneige-electrique-autrichie#.YEkIETZYYdU.

"Snowbird", FH-Joanneum University of Applied Sciences, Nov. 2011-Feb. 2013, https://www.fh-joanneum.at/en/projekt/snowbird/.

https://www.youtube.com/watch?v=mLIaLhXoFUs, Snowmobile Spritztour, Published Jan. 25, 2015.

https://www.motoneigeauquebec.com/forum/content.php?518-Motoneige-%E9Iectrique-version-Su%E9doise-et-sportive, published Dec. 3, 2013.

https://sverigesradio.se/sida/artikel.aspx?programid=109&artikel=5033462, Storuman, Mar. 24, 2012.

https://www.svt.se/nyheter/lokalt/vasterbotten/el-skotern-ska-satta-storuman-pa-kartan, Jan. 20, 2015.

http://advantage-environment.com/transport/introducing-the-electric-snowmobile/ (accessed via https://web.archive.org/ to obtain properly displayed images), Mar. 2011.

https://newatlas.com/clean-snowmobile-challenge-2011/18121/, Mar. 17, 2011.

www.icatpro.com/electric-snowmobile-icatpro-zero-emission-technology/, Nov. 30, 2017.

https://www.vice.com/en/article/9397m8/the-first-electric-snowmobile-in-the-market-is-a-remarkably-quiet-ride, Apr. 16, 2020.

https://www.youtube.com/watch?v=Z-TbgZvYBpM&ab_channel=dubedubz, Dec. 6, 2016.

https://www.youtube.com/watch?v=zAYICbZAFpQ&ab_channel=TaigaMotors, Apr. 15, 2020.

* cited by examiner

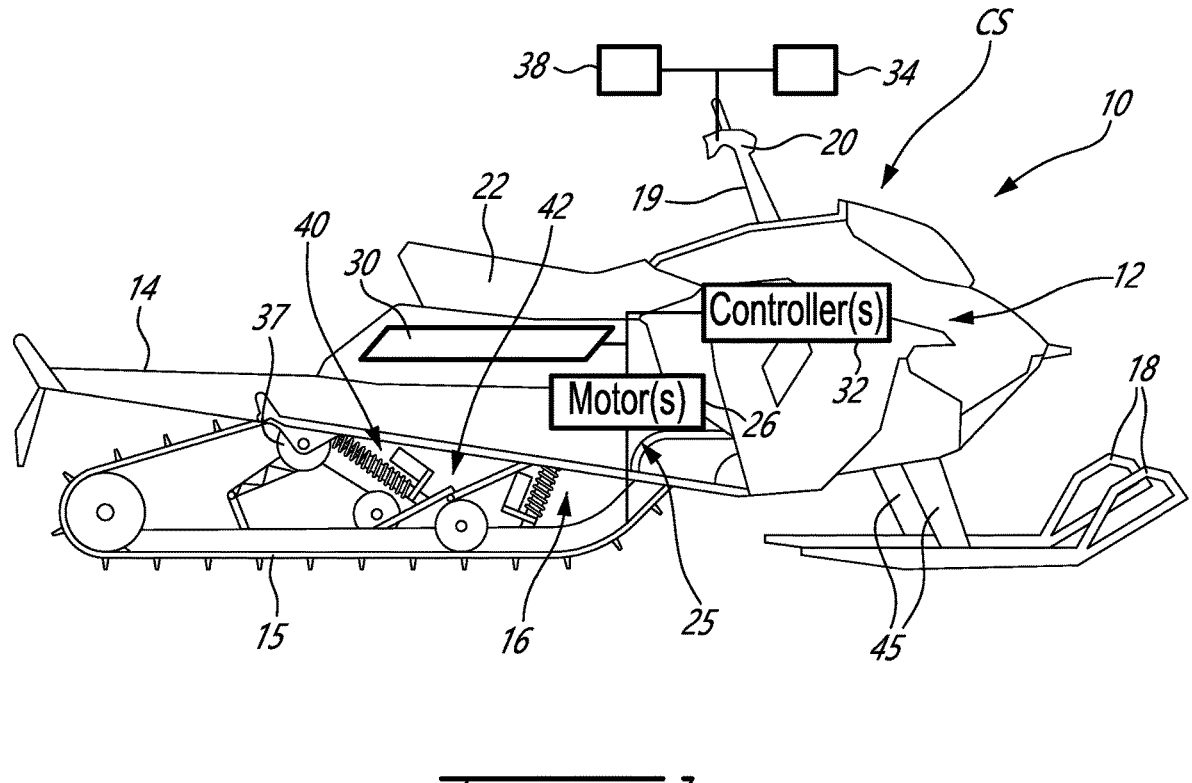

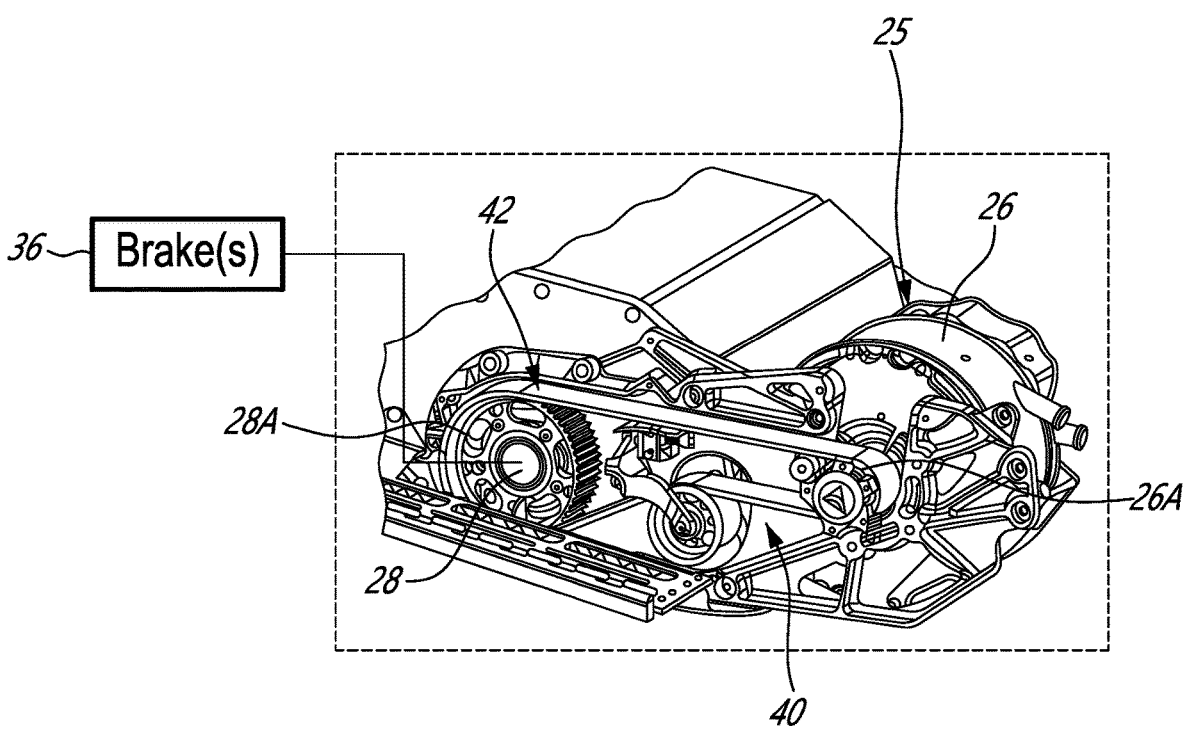
36 — Brake(s)

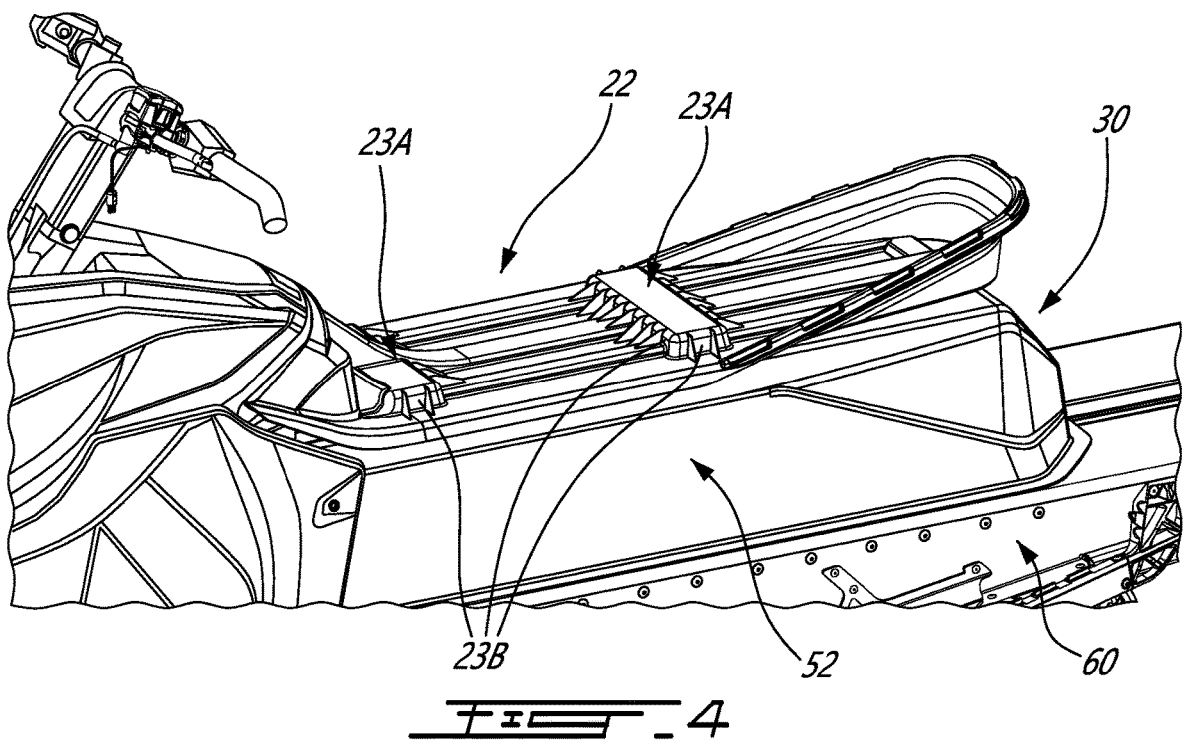
_FIG_.4
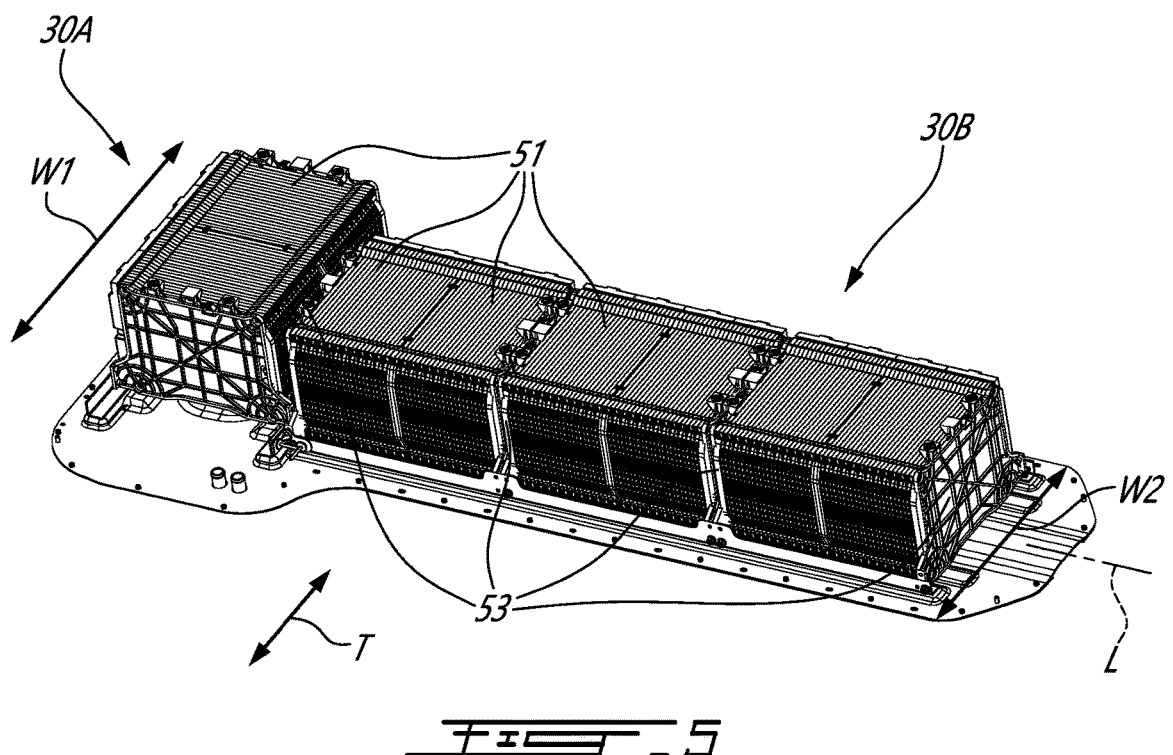
_FIG_.5

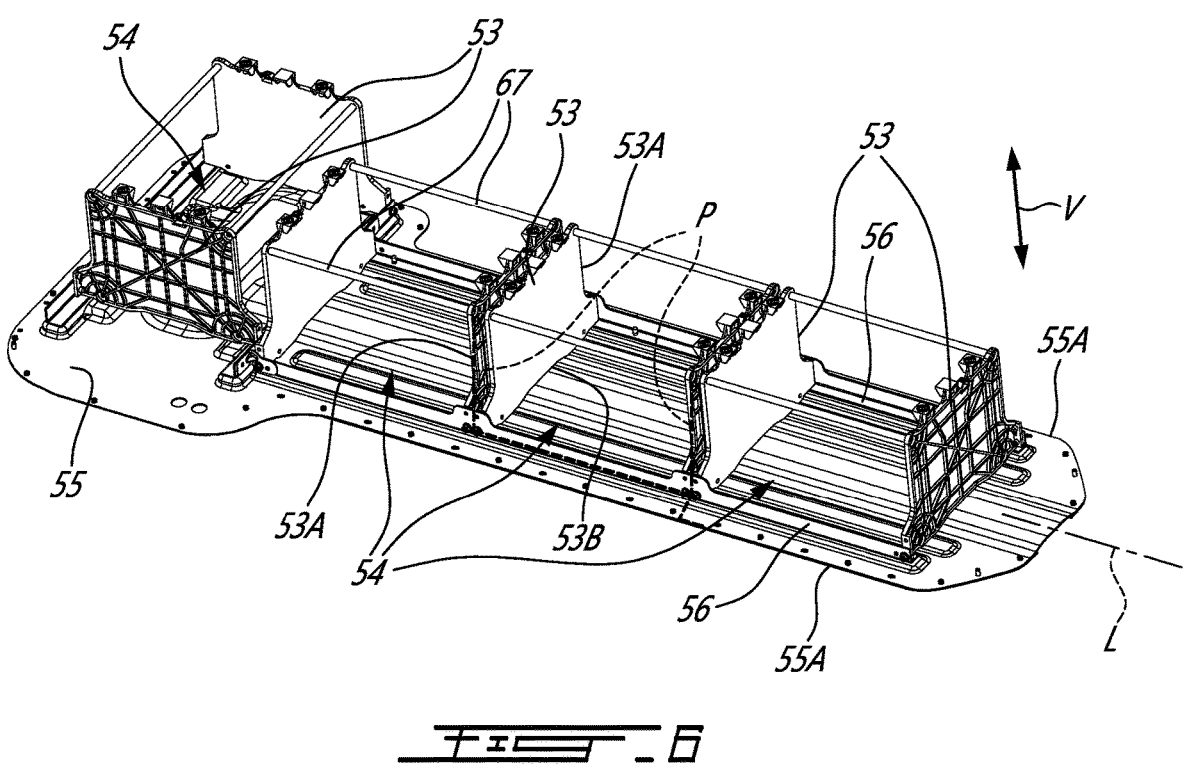
$\mathbf{\mathsf{FIG.6}}$
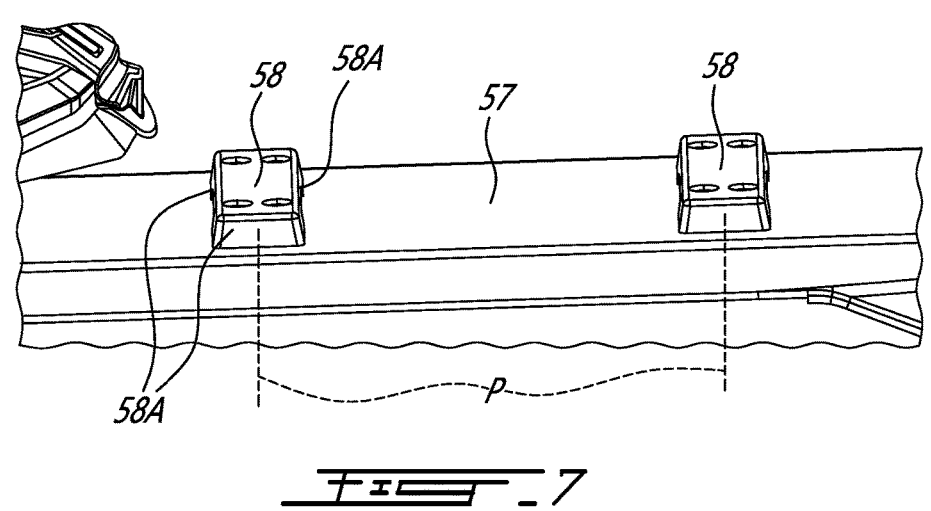
$\mathbf{\mathsf{FIG.7}}$

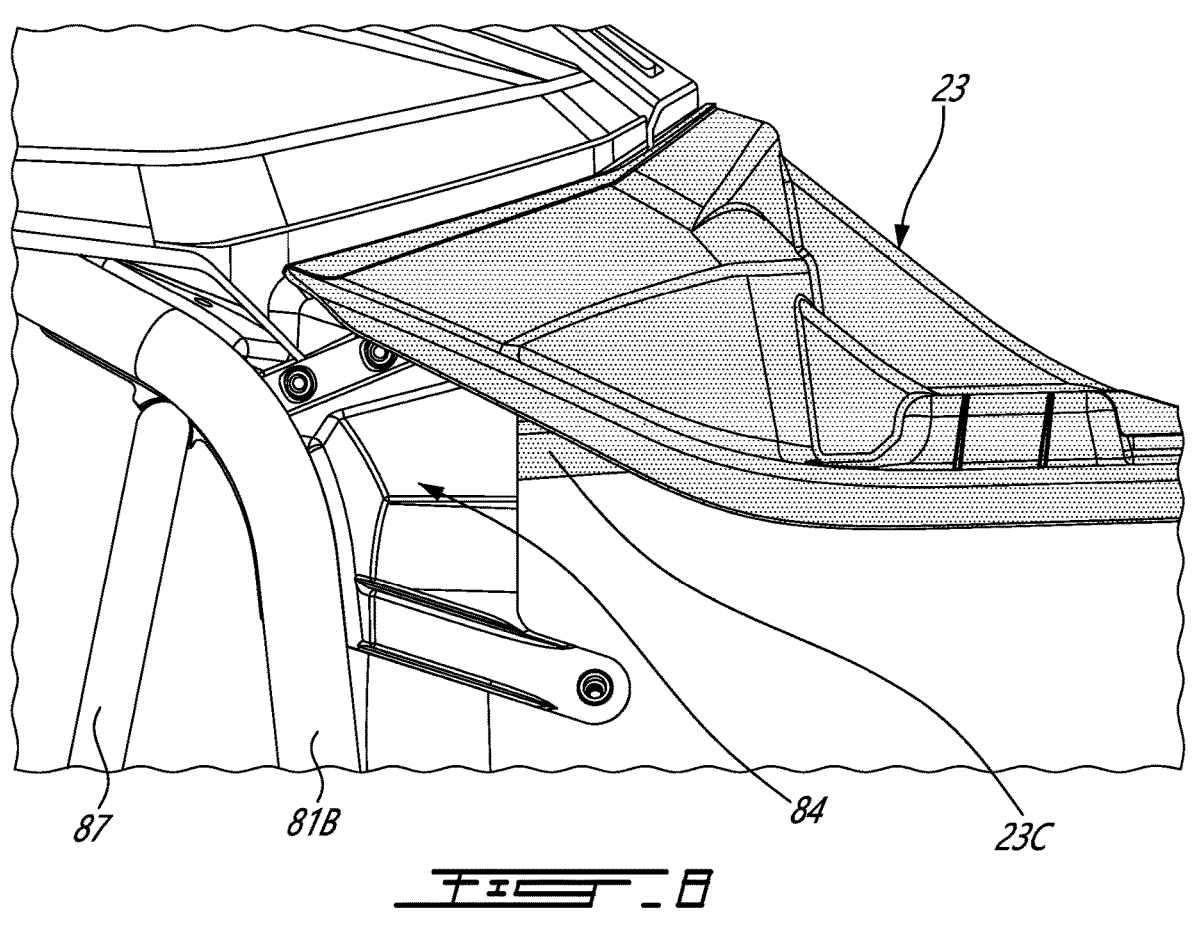
_FIG_8_
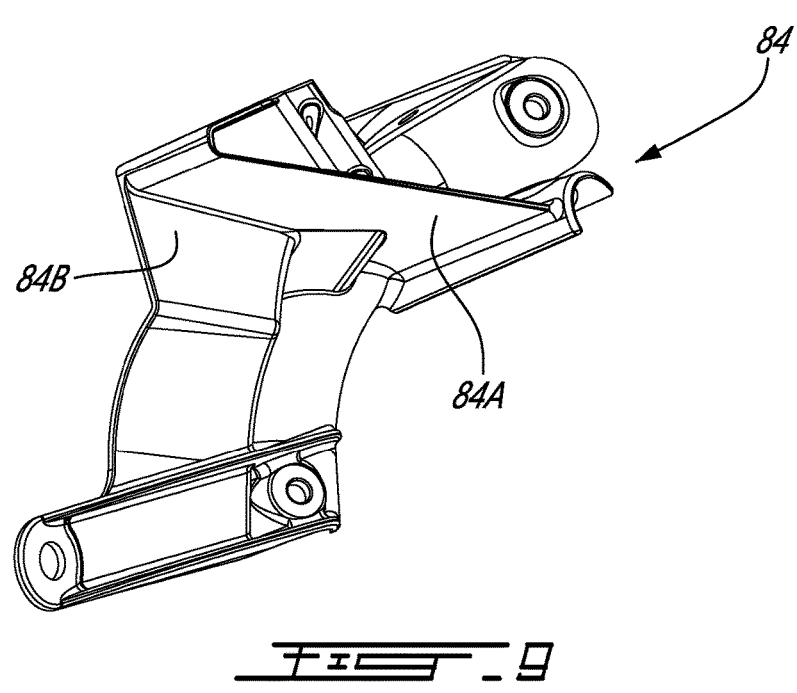
_FIG_9_

91

94

90

93

92

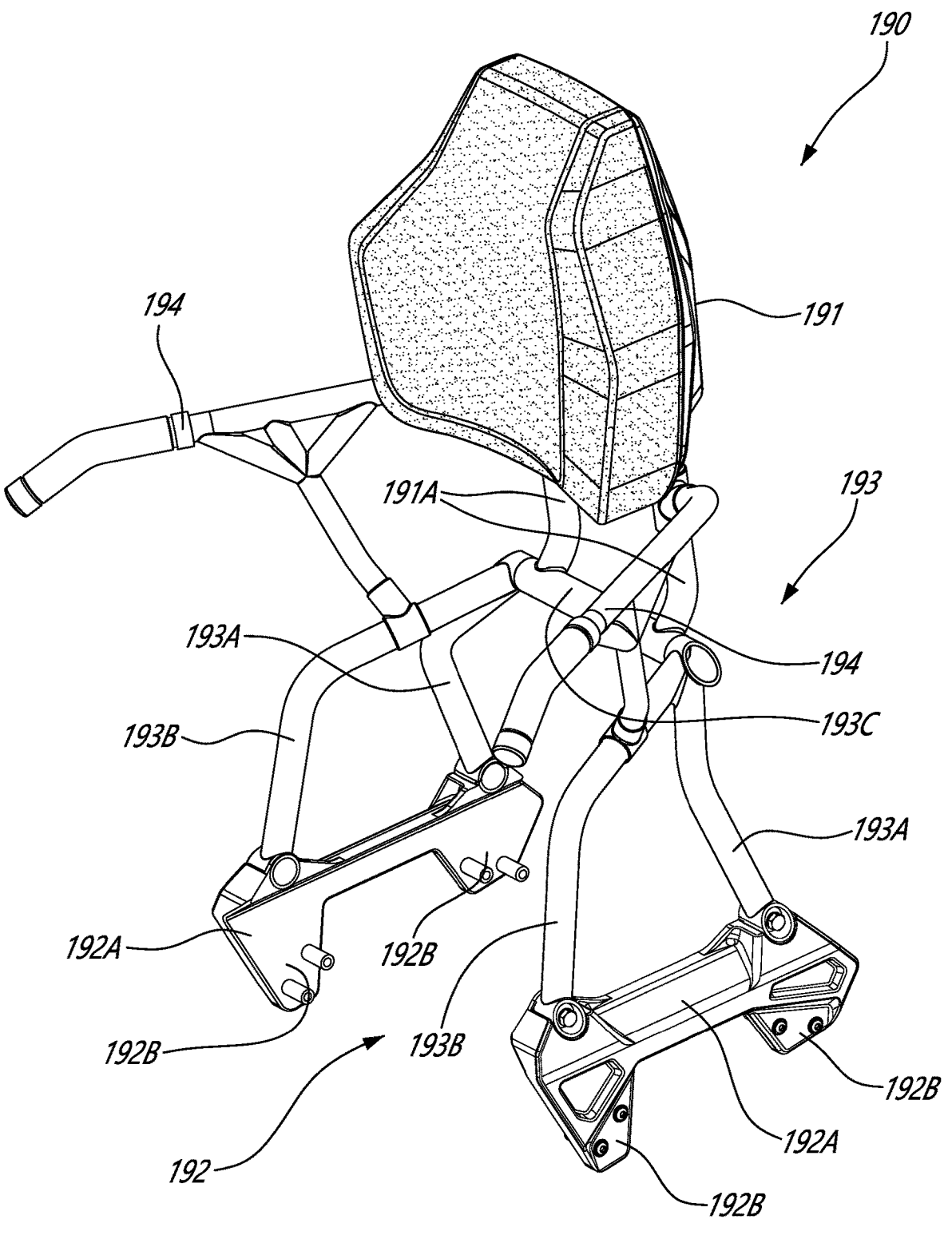
_FIG. 14_

SEAT ATTACHMENT FOR ELECTRIC RECREATIONAL VEHICLE

CROSS-REFERENCE TO RELATED APPLICATIONS

This application claims priority from U.S. Provisional Patent Application No. 63/368,679, filed Jul. 18, 2022, and from U.S. Provisional Patent Application No. 63/370,969, filed Aug. 10, 2022.

TECHNICAL FIELD

The application relates generally to electric vehicles and, more particularly, to electrically-powered recreational vehicles.

BACKGROUND OF THE ART

Some recreational vehicles, such as snowmobiles and personal watercrafts, combust fuel in an internal-combustion engine. The architecture of such fuel-consuming vehicles is designed to accommodate the size, weight and loads generated by the internal-combustion engine during operation of the snowmobile. The architecture of such fuel-consuming vehicles is also designed to accommodate the evacuation of hot combustion gases, cooling of components, and the lubrication of still other components.

For recreational vehicles having batteries that supply electrical power to one or more electric motors for propulsion, the architecture of the recreational vehicle may be different than that of fuel-consuming recreational vehicles.

SUMMARY

In one aspect, there is provided an electric recreational vehicle, comprising: a frame extending along a longitudinal axis between a front end and a rear end of the frame; an electric motor mounted to the frame; a battery pack mounted to the frame and disposed at least partially rearward of the electric motor relative to the longitudinal axis, the battery pack including one or more battery modules operatively connected to the electric motor for supplying electrical energy to the electric motor, a battery enclosure containing the one or more battery modules, and at least one structural member located within the battery enclosure and delimiting at least one module-receiving section, the one or more battery modules located within the at least one module-receiving section; and a seat disposed over the battery pack and, optionally, secured to the at least one structural member of the battery pack, a load transmission path extending between the frame and the seat through the at least one structural member of the battery pack.

The electric recreational vehicle described above may include any of the following features, in any combinations.

In some embodiments, the at least one structural member includes two structural members connected together to compress the one or more battery modules therebetween.

In some embodiments, the frame includes a tunnel at least partially enclosing a space receiving a drive track, the battery pack disposed over the tunnel and secured to the tunnel, the seat secured to the tunnel via the battery pack, the load transmission path extending from the tunnel to the seat through the at least one structural member of the battery pack.

In some embodiments, the frame includes a sub-frame disposed forward of the tunnel relative to the longitudinal axis, the frame including a structure disposed over the sub-frame, movements of the seat in a transverse direction perpendicular to the longitudinal axis and in a vertical direction perpendicular to both of the transverse direction and the longitudinal axis blocked or inhibited by the structure.

In some embodiments, the structure includes two front legs secured to front suspensions and two rear legs secured to the tunnel, the structure including two brackets each secured to a respective one of the two rear legs, the seat in abutment against the two brackets.

In some embodiments, the two brackets define first abutment faces facing a lateral direction transverse to the longitudinal axis and second abutment faces facing the vertical direction transverse to both of the longitudinal axis and the lateral direction, the seat having two tabs protruding along the longitudinal axis from a forward end of the seat, each of the two tabs in abutment against both of a respective one of the first abutment faces and a respective one of the second abutment faces.

In some embodiments, the two tabs are monolithically connected to a body of a seat pan of the seat.

In some embodiments, the battery enclosure includes a bottom panel secured to the frame, the at least one structural member including a plurality of structural members secured to the bottom panel and longitudinally distributed about the longitudinal axis, the structural members being transverse to the bottom panel, the seat optionally secured to at least one of the structural members.

In some embodiments, the battery enclosure includes a cover disposed over the one or more battery modules, at least one cleat disposed on a top panel of the cover, the at least one cleat secured to the at least one of the structural members, the load transmission path extending through the at least one cleat.

In some embodiments, the seat includes at least one recess sized to accept the at least one cleat, the at least one cleat engaging the at least one recess to block or inhibit movements of the seat along a longitudinal direction parallel to the longitudinal axis and a along a transverse direction perpendicular to the longitudinal axis.

In some embodiments, the at least one cleat and the at least one recess includes two cleats and two recesses axially spaced apart from one another relative to the longitudinal axis.

In some embodiments, the electric recreational vehicle includes a hook secured to a rear end of the battery pack, the hook engaging the seat. The hook may be secured to the at least one structural member. Optionally, the battery enclosure includes a cover disposed over the one or more battery modules, the hook secured to a rear end of the cover.

In some embodiments, the hook extends within an aperture defined through the seat, the hook fastened to the seat.

In some embodiments, the electric recreational vehicle is one of a snowmobile and a personal watercraft.

In another aspect, there is provided an electric recreational vehicle, comprising: a frame extending along a longitudinal axis between a front end and a rear end of the frame; an electric motor mounted to the frame; a battery pack mounted to the frame and disposed at least partially rearward of the electric motor relative to the longitudinal axis, the battery pack including one or more battery modules operatively connected to the electric motor for supplying electrical energy to the electric motor, a battery enclosure containing the one or more battery modules, and at least one structural member located within the battery enclosure and delimiting at least one module-receiving section, the one or more battery modules located within the at least one module-receiving section; and a seat disposed over the battery pack, the seat secured to the frame via the at least one structural member.

The electric recreational vehicle described above may include any of the following features, in any combinations.

In some embodiments, the frame includes a tunnel at least partially enclosing a space receiving a drive track, the battery pack disposed over the tunnel and secured to the tunnel, the seat secured to the tunnel via the battery pack.

In some embodiments, the frame includes a sub-frame disposed forward of the tunnel relative to the longitudinal axis, the frame including a structure disposed over the sub-frame, movements of the seat in a transverse direction perpendicular to the longitudinal axis and in a vertical direction perpendicular to both of the transverse direction and the longitudinal axis blocked or inhibited by the structure.

In some embodiments, the structure includes at least two front legs secured to front suspensions and two rear legs secured to the tunnel, the structure including two brackets each secured to a respective one of the two rear legs, the seat in abutment against the two brackets.

In some embodiments, the two brackets define first abutment faces facing the transverse direction and second abutment faces facing the vertical direction, the seat having two tabs protruding along the longitudinal axis from a forward end of the seat, each of the two tabs in abutment against both of a respective one of the first abutment faces and a respective one of the second abutment faces.

In some embodiments, the two tabs are monolithically connected to a body of a seat pan of the seat.

In some embodiments, the battery enclosure includes a bottom panel secured to the tunnel and ribs secured to the bottom panel and longitudinally distributed about the longitudinal axis, the ribs being transverse to the bottom panel, the one or more battery modules distributed between the ribs, the seat secured to at least one of the ribs.

In some embodiments, the battery enclosure includes a cover disposed over the one or more battery modules, at least one cleat disposed over a top panel of the cover, the at least one cleat secured to one of the ribs and/or the at least one structural member.

In some embodiments, the seat includes at least one recess sized to accept the at least one cleat, the at least one cleat engaging the at least one recess to block or inhibit movements of the seat along a longitudinal direction parallel to the longitudinal axis and a along a transverse direction perpendicular to the longitudinal axis.

In some embodiments, the at least one cleat and the at least one recess includes two cleats and two recesses axially spaced apart from one another relative to the longitudinal axis.

In some embodiments, the electric recreational vehicle includes a hook secured to a rear end of the battery pack, the hook engaging the seat. The hook may be secured to the at least one structural member. Optionally, the battery enclosure includes a cover disposed over the one or more battery modules, the hook secured to a rear end of the cover.

In some embodiments, the hook extends within an aperture defined through the seat, the hook fastened to the seat.

In some embodiments, the electric recreational vehicle is one of a snowmobile and a personal watercraft.

In yet another aspect, there is provided an electric recreational vehicle, comprising: a frame extending along a longitudinal axis between a front end and a rear end of the frame; an electric motor mounted to the frame; a battery pack mounted to the frame and disposed at least partially rearward of the electric motor relative to the longitudinal axis; and a back rest secured to the frame and disposed rearward of the battery pack.

The electric recreational vehicle described above may include any of the following features, in any combinations.

In some embodiments, the frame includes a tunnel enclosing a drive track, the back rest secured to the tunnel rearward of the battery pack.

In some embodiments, the back rest includes a top section for supporting a back of a user, a base section secured to the tunnel, and a pillar section connecting the top section to the base section.

In some embodiments, the pillar section is vertically aligned with the battery pack.

In yet another aspect, there is provided an electric recreational vehicle, comprising: a frame extending along a longitudinal axis between a front end and a rear end; an electric motor mounted to the frame; a battery pack mounted to the frame, the battery pack including one or more battery modules operatively connected to the electric motor for supplying electrical energy to the electric motor, a battery enclosure containing the one or more battery modules, and at least one structural member located within the battery enclosure and applying compression to the one or more battery modules; and a seat disposed over the battery pack, the seat secured to the frame via the at least one structural member.

DESCRIPTION OF THE DRAWINGS

Reference is now made to the accompanying figures in which:

FIG. 1 is a schematic representation of an electric recreational vehicle depicted as an electric snowmobile;

FIG. 2 is an enlarged three dimensional view of a transmission of the electric snowmobile of FIG. 1;

FIG. 4 is a three dimensional view illustrating a seat pan secured to a battery pack of the electric snowmobile of FIG. 1;

FIG. 5 is a three dimensional view illustrating internal components of the battery pack of the electric snowmobile of FIG. 1;

FIG. 6 is another three dimensional view illustrating structural components of the battery pack of FIG. 5 with battery modules thereof removed for illustration purposes;

FIG. 7 is a three dimensional view of a cover of the battery pack of FIG. 5;

FIG. 8 is an enlarged side view illustrating a connection arrangement between the seat and the frame of the electric snowmobile of FIG. 1;

FIG. 9 is a three dimensional view of a bracket of the frame of the electric snowmobile of FIG. 1 used as part of the connection arrangement of FIG. 8;

FIG. 14 is a three dimensional view of another embodiment of a backrest.

DETAILED DESCRIPTION

Figure 3:
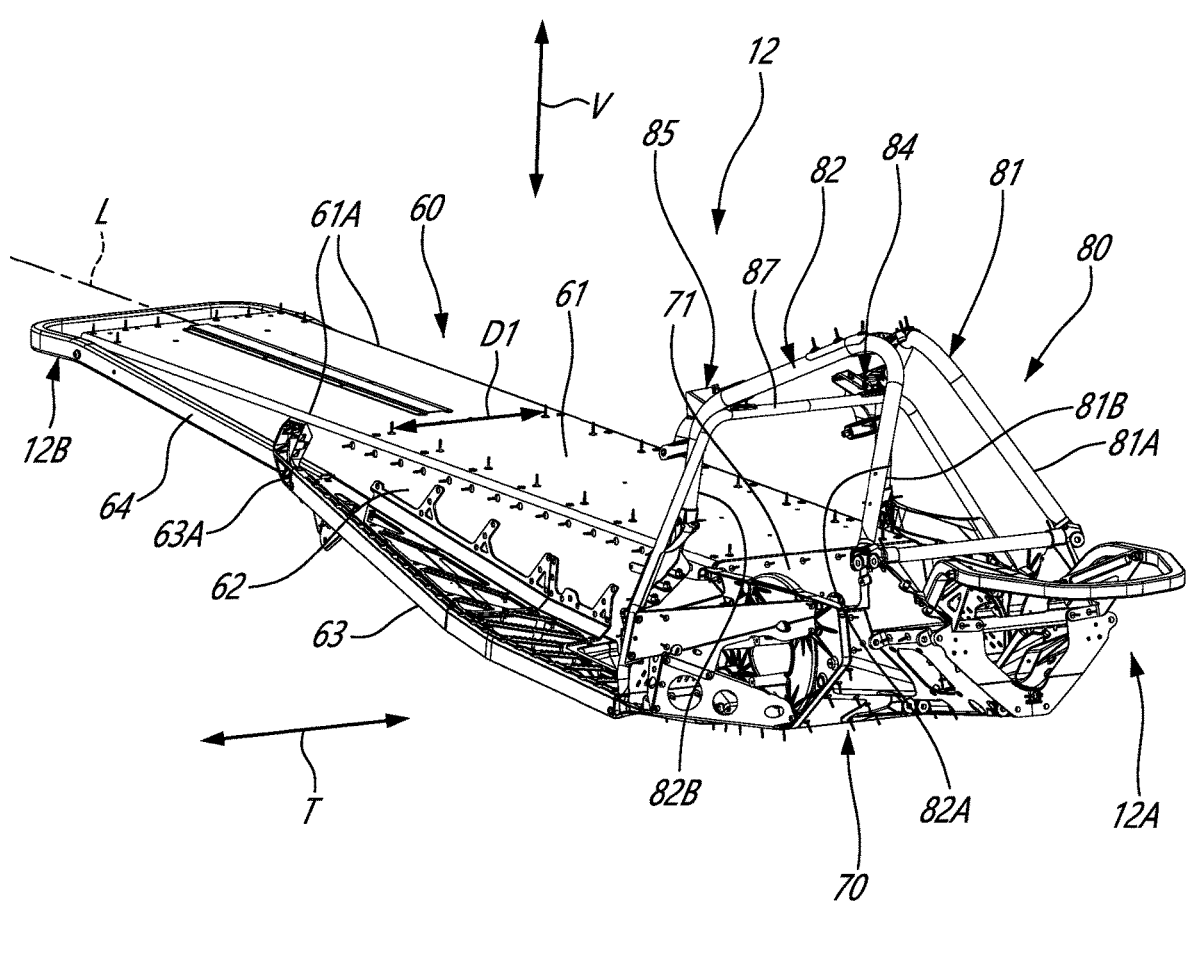
FIG. 3 is a front three dimensional view of a frame of the electric snowmobile of FIG. 1.

The following disclosure relates to recreational straddle seat vehicles and associated methods for operating the straddle seat vehicles. The straddle seat vehicles are drivingly engaged to motors for effecting propulsion of the vehicles in both forward and reverse directions. In some embodiments, the straddle seat vehicles and methods described herein may be applicable to electric powersport vehicles that may be operated off-road and/or in relatively rugged environments. Examples of suitable off-road electric and non-electric powersport vehicles include snowmobiles, all-terrain vehicles (ATVs) (e.g. side-by-sides), and utility task vehicles (UTVs). As used herein, the term off-road vehicle refers to vehicles to which at least some regulations, requirements or laws applicable to on-road vehicles do not apply. In some embodiments, the vehicles and methods described herein may, based on one or more positions of an input device operatively connected to a motor, determine the forward direction and reverse direction of propulsion for the vehicle.

The terms "connected", "connects" and "coupled to" may include both direct connection and coupling (in which two elements contact each other) and indirect connection and coupling (in which at least one additional element is located between the two elements).

With reference to FIG. 1, an electric recreational vehicle depicted as an electric snowmobile in accordance with one embodiment is shown at 10. It will be appreciated that the present disclosure may apply to any electric recreational vehicle such as personal watercrafts, all-terrain vehicles, and so on. The electric snowmobile 10 may include a frame 12 (also known as a body or a chassis) which may include a tunnel 14, a drive track 15 having the form of an endless belt for engaging the ground (e.g., snow) and disposed under the tunnel 14, and a powertrain 16 mounted to the frame 12 and configured to displace the drive track 15. Skis 18 are disposed in a front portion of the electric snowmobile 10, and a straddle seat 22 is disposed above the tunnel 14 for accommodating an operator of the electric snowmobile 10 and optionally one or more passengers. Skis 18, namely left and right skis, may be movably attached to the frame 12 to permit steering of the electric snowmobile 10 via a steering assembly including a steering column 19 connected to a handle 20. Front suspensions 45 are connected to the skis 18 and used to dampen movements of the electric snowmobile 10 when in use.

Referring to FIGS. 1 and 2, the powertrain 16 of the electric snowmobile 10 includes an electric motor assembly 25. The electric motor assembly 25 is a collection of components and features which function to deliver an electric drive to displace the electric snowmobile 10. The electric motor assembly 25 includes one or more electric motor(s) 26 drivingly coupled to the drive track 15 via a drive shaft 28. In one embodiment, the electric motor 26 has a maximum output power of between 120 and 180 horse power. In other embodiments, the electric motor 26 has a maximum output power of at least 180 horse power. The drive shaft 28 may be drivingly coupled to the drive track 15 via one or more toothed wheels or other means so as to transfer motive power from the electric motor 26 to the drive track 15. The powertrain 16 may also include a battery pack 30 for providing electric energy (i.e. electric current) to the electric motor 26 and driving the electric motor 26. The operation of the electric motor 26 and the delivery of drive current to the electric motor 26 from the battery pack 30 may be controlled by a controller 32 based on an actuation of an input device 34, sometimes referred to as a "throttle" or "accelerator", by the operator. The controller 32 and the input device 34 are part of a control system CS for controlling operation of the electric snowmobile 10. In some embodiments, the battery pack 30 may be a lithium ion or other type of battery pack 30.

The electric snowmobile 10 may also include one or more brake(s) 36 (referred hereinafter in the singular) that may be applied or released by an actuation of a brake actuator (e.g., lever) 38 by the operator for example. The brake 36 may be operable as a main brake for the purpose of slowing and stopping the electric snowmobile 10 during motion of the electric snowmobile 10. The brake 36 may comprise a combination of tractive braking and regenerative braking. In some embodiments, the brake 36 may be operable as described in U.S. patent application Ser. No. 17/091,712 entitled "Braking system for an off-road vehicle". Alternatively or in addition, the brake 36 may be operable as a parking brake, sometimes called "e-brake" or "emergency brake", of the electric snowmobile 10 intended to be used when the electric snowmobile 10 is stationary. In various embodiments, such main and parking brake functions may use separate brakes, or may use a common brake 36. In some embodiments of tractive braking, the brake actuator 38 may be lockable when the brake 36 is applied in order to use the brake 36 as a parking brake. The brake 36 may be electrically or hydraulically operated. For example, the brake 36 may include a master cylinder operatively coupled to a brake caliper that applies brake pads against a brake rotor that is coupled to the powertrain 16. In some embodiments, such brake rotor may be secured to and rotatable with the drive shaft 28. In some embodiments of regenerative braking, the brake 36 is electrically connected to the battery pack 30. The brake 36 is a regenerative brake 36, or applies regenerative braking, such that the brake 36 or components thereof are able to supply the battery pack 30 with electric energy when the brake 36 is applied to a component of the powertrain 16, and/or when the operator releases the input device 34 (e.g., accelerator).

Still referring to FIGS. 1 and 2, the electric motor 26 is in torque-transmitting engagement with the drive shaft 28 via a transmission 40. The transmission 40 may be of a belt/pulley type, a chain/sprocket type, or a shaft/gear type for example. Referring to FIG. 2, the transmission 40 is of a belt/pulley type. The transmission 40 includes a drive belt 42 that is mounted about a motor output 26A of the electric motor 26, and is also mounted about a drive track wheel 28A for driving the drive shaft 28. The drive belt 42 therefore extends between the motor output 26A and the drive track wheel 28A for conveying torque from the electric motor 26 to the drive shaft 28. The drive shaft 28 provides torque to the drive track 15. The drive belt 42 is thus displaced or driven by the motor output 26A in a linear manner between the motor output 26A and the drive track wheel 28A, and in a circumferential manner about the motor output 26A and the drive track wheel 28A.

Referring now to FIG. 3, the frame 12 of the electric snowmobile 10 extends along a longitudinal axis L between a front end 12A and a rear end 12B. The frame 12 includes a tunnel 60, a sub-frame 70, and a structure 80. The sub-frame 70 is disposed forward of the tunnel 60 relative to the longitudinal axis L. The sub-frame 70 may define a cavity or spacing that is sized for receiving the electric motor 26. The electric motor 26 may be secured (e.g., fastened to the sub-frame 70). The tunnel 60 at least partially encloses a spacing receiving the drive track 15 (FIG. 1). The sub-frame 70 defines a bulkhead 71 that connects the sub-frame 70 to the tunnel 60. The structure 80 is disposed over the sub-frame 70. The structure 80 may be secured to the tunnel 60, to the sub-frame 70, and to the front suspensions 45 (FIG. 1). More specifically, and in the embodiment shown, the structure 80 is connected to the front suspension 45 and to the sub-frame 70 at the same one or more locations.

One of the functions of the tunnel 60 is to support the straddle seat 22 (FIG. 1) and the user sitting on the straddle seat 22. Another function of the tunnel 60 is to transmit loads imparted to the electric snowmobile 10 via the drive track 15. These loads may include, for instance, acceleration and deceleration forces and moments about the longitudinal axis L. To resist the moments imparted to the tunnel 60, the tunnel 60 requires a suitable torsional stiffness. The torsional stiffness in the context of the present disclosure corresponds to the resistance of the tunnel 60 against deformation when subjected to a torque defined about the longitudinal axis L.

The tunnel 60 has a top panel 61 defining a substantially planar surface that faces upwardly in a vertical direction V. The expression "substantially" used in the context of the present disclosure is meant to encompass slight variations caused by manufacturing tolerances. The tunnel 60 includes two side panels 62 each extending downwardly from longitudinal edges 61A of the top panel 61. The two side panels 62 are therefore substantially transverse to the top panel 61 to partially enclose the spacing sized for receiving the drive track 15. The tunnel 60 may be a sheet bended to define the longitudinal edges 61A located at intersections between the top panel 61 and the two side panels 62. The tunnel 60 includes foot rests 63 (sometimes referred to as "running boards"), namely left and right foot rests each sized for receiving a foot of a user sitting on the straddle seat 22 (FIG. 1) of the electric snowmobile 10. The foot rests 63 may each extend transversally in a transverse direction T being perpendicular to the longitudinal axis L from a respective one of the two side panels 62. In the embodiment shown, the foot rests 63 are secured to bottom edges of the two side panels 62. The foot rests 63 extend longitudinally relative to the longitudinal axis L from the sub-frame 70 towards the rear end 12B of the frame 12.

Still referring to FIG. 3, in the embodiment shown, a peripheral beam 64 is secured to the tunnel 60 and extends from a rear end 63A of one of the foot rests 63, wraps around a rear portion of the tunnel 60 at the rear end 12B of the frame 12 and reaches the rear end 63A of the other of the foot rests 63. The peripheral beam 64 may be secured to the tunnel 60 adjacent the rear ends 63A of the foot rests 63 and at one or more locations along its length. The peripheral beam 64 may increase a stiffness of the tunnel 60. The peripheral beam 64 may provide a bumper at the rear end 12B of the frame 12.

Still referring to FIG. 3, the structure 80 may be made with tubular members, which may be made of steel, or other suitable materials. In the embodiment shown, the structure 80 includes left and right primary members 81, 82 interconnected to one another and defining four legs, namely, a left front leg 81A, a left rear leg 81B, a right front leg 82A, and a right rear leg 82B. Herein, the expression "left" and "right" are in relation to a user sitting on the straddle seat 22 (FIG. 1) and looking towards the direction of travel of the electric snowmobile 10. Each of the four legs 81A, 82A, 81B, 82B define a respective end via which the structure 80 is secured to the tunnel 60 and the sub-frame 70. More specifically, the left front leg 81A defines a left front end secured to one of the front suspensions 45 (FIG. 1), the left rear leg 81B defines a left rear end secured to the tunnel 60, the right front leg 82A defines a right front end secured to the other of the front suspensions 45, and the right rear leg 82B defines a right rear end secured to the tunnel 60.

In the embodiment shown, the structure 80 includes a transverse member 87 that extends substantially transversally to the longitudinal axis L from a left end to a right end. The transverse member 87 is secured to the left and right primary members 81, 82. The transverse member 87 is further secured to the sub-frame 70 and is used to secure the structure 80 to the sub-frame 70. The transverse member 87 is secured to both of the left and right primary members 81, 82 via left and right brackets as will be described below. The left end of the transverse member 87 is secured to one of the foot rests 63 and the right end of the transverse member 87 is secured to the other of the foot rests 63. Thus, the two foot rests 63 may be secured to one another via the transverse member 87. More details about the structure can be found in U.S. patent application No. 63/368,679.

Alternatively, the structure 80, which may include a transverse member 87, is connected to the front suspension 45 via left and right front legs 81A, 82A, and to the sub-frame 70 via transverse member 87. Thus, loads are transferred from the skis 18 to the front suspensions 45 and from the front suspensions 45 to the structure 80, and from the structure 80 to the tunnel 60 and sub-frame 70.

As shown in FIG. 3, two brackets are secured to the left and right primary members 81, 82 of the structure 80. These two brackets include a left bracket 84 and a right bracket 85. The left bracket 84 is used to secure the left primary member 81 to the transverse member 87. The right bracket 85 is used to secure the right primary member 82 to the transverse member 87. As will be discussed below, the left bracket 84 and the right bracket 85 are used in securing the straddle seat 22 to the frame 12.

Referring now to FIG. 4, a seat pan 23 of the straddle seat 22 is shown disposed over the battery pack 30. The seat pan 23 provides structural stiffness to the straddle seat 22. A cushion may be secured to the seat pan 23 to provide comfort to users. In the embodiment shown, the seat pan 23 is secured to the tunnel 60 via the battery pack 30. The battery pack 30 is mounted to the frame 12 and disposed at least partially rearward of the electric motor 26 relative to the longitudinal axis L. The seat pan 23 defines two recesses 23A longitudinally spaced apart from one another relative to the longitudinal axis L. Each of those two recesses 23A may be rectangular shaped, but other shapes are contemplated. These recesses 23A have a width extending in the transverse direction T. Although two recesses 23A are shown, only one or more than two recesses 23A may be used. These recesses 23A, as will be explained below, are used to secure the seat pan 23 to the battery pack 30. The recesses 23A appear as bumps when seen from a top side of the seat pan 23, but are seen as cavities/recesses when seen from a bottom side facing the battery pack 30. Ribs may be integrally formed in the seat pan 23 to reinforce the walls of the recesses 23A.

Referring to FIG. 5, the battery pack 30 includes one or more battery modules 51 operatively connected to the electric motor 26 (FIG. 1) for supplying electrical energy to the electric motor 26. The battery pack 30 further includes a battery enclosure 52 (FIG. 4) containing the one or more battery modules 51. The battery enclosure 52 may support the battery modules 51 and protect the battery modules 51 from external impacts, water and/or other hazards or debris. In the embodiment shown, the battery pack 30 has a front section 30A and a rear section 30B located rearward of the front section 30A relative to the longitudinal axis L. A width W1 of the front portion relative to the transverse direction T normal to the longitudinal axis L is greater than a width W2 of the rear section 30B. The structure 80 is disposed over the front portion of the battery pack 30. The two rear legs of the structure 80 may be located proximate an intersection between the front and rear sections of the battery pack 30.

In some embodiments, a structural battery enclosure may absorb loads exerted on the frame 12 from the straddle seat 22, front suspension 45, steering column, and so on. The straddle seat 22 may thus be connected directly to the structural battery enclosure. In the present embodiment, the snowmobile 10 has the structure 80 that receives loads from steering column and front suspensions 45. As will be discussed below, the battery enclosure 52 has a cover that may be less structural and more aesthetic and protective to provide a sealed enclosure for the battery modules 51. However, the straddle seat 22 still needs to be structurally supported.

In the present embodiment, and as will be explained in further detail below, the straddle seat 22 is structurally connected to structural members of the battery pack 30 that are found inside the battery enclosure. These structural members may include structural plates, also referred to as end-plates or bulkheads that secure a number of battery modules 51 together and connect them to a bottom panel of the battery enclosure 52, which in turn is connected to the tunnel 60 of the electric snowmobile 10.

Referring to FIGS. 5-6, in the present embodiment, the battery pack 30 includes structural members 53 located within the battery enclosure 52 and delimiting a plurality of module-receiving sections 54. The battery modules 51 are located within the module-receiving sections 54. Within the rear section 30B of the battery pack 30, the structural members 53 are herein distributed along the longitudinal axis L and are spaced apart from one another in a longitudinal direction parallel to the longitudinal axis L. The structural members 53 extend transversally to the longitudinal axis L in the transverse direction T. A module-receiving section 54 is defined between two adjacent ones of the structural members 53. Although six structural members 53 are shown within the rear section 30B of the battery pack 30, and two structural members 53 are shown within the front section 30A, only one, two, three, or more than four structural members 53 may be used in each of those sections. The structural members 53 may alternatively extend parallel to the longitudinal axis L and spaced apart from one another in the transverse direction T. Herein, the rear section 30B of the battery pack 30 includes three module-receiving sections 54, comprising 6 structural members 53, longitudinally spaced apart from one another about the longitudinal axis L. Only one, two, or more than three module-receiving sections 54 may be used in an alternate embodiment. The structural members 53 of different module-receiving sections 54 that are positioned back-to-back within the rear section 30B may be mechanically connected together. Alternatively, there may be no connection between adjacent structural members 53 of different module-receiving sections 54. The front section 30A of the battery pack 30 may include two structural members 53 spaced apart from one another in the transverse direction T and extending longitudinally about the longitudinal axis L. One module-receiving section 54 is defined between the two structural members 53 of the front section 30A of the battery pack 30. Any suitable number of module-receiving sections 54 and/or structural members 53 may be used.

Referring more particularly to FIG. 6, these structural members 53 are herein structural plates or ribs extending substantially in the vertical direction V from a bottom panel 55 of the battery enclosure 52. In the embodiment shown, rails 56 are secured to the bottom panel 55 and run along the longitudinal axis L. These rails 56 may have a L-shape cross-section. The rails 56 are each disposed adjacent a respective edge 55A of the bottom panel 55. Each of the structural members 53 is secured to both of the rails 56 proximate its lateral sides 53A and proximate its bottom edge 53B. The structural members 53 may be fastened to the rails 56 using any suitable fastening means such as rivets, bolts and nuts, glue, welding, brazing, clamping and so on. In some configurations, those rails 56 may be avoided and the structural members 53 may be affixed directly on the bottom panel 55, or to both of the bottom panel 55 and to the rails 56. The bottom panel 55 of the battery enclosure 52 is secured to the frame 12. More specifically, in the disclosed embodiment, the bottom panel 55 is secured to the tunnel 60. The bottom panel 55 may be fastened, glued, welded, brazed, etc to the tunnel 60. The battery modules 51 may be secured to the bottom panel 55. During manufacturing, the rails 56 are mounted to the bottom panel 55 of the battery enclosure 52. The battery modules 51 may then be attached to the structural members 53 before being attached to the rails 56.

In an alternate embodiment, the rails 56 may be secured to the tunnel 60. Stated differently, fasteners may be used to secure the rails 56 directly to the tunnel 60. These fasteners may extend through apertures defined by the bottom panel 55 to engage the tunnel 60. Thus, the bottom panel 55 may be sandwiched between the rails 56 and the tunnel 60. The bottom panel 55 may be free of direct connection to the tunnel 60 and may be secured to the tunnel 60 via the rails 56 directly secured to the tunnel 60. In another alternate embodiment, the bottom panel 55 may be omitted. In such a configuration, the battery enclosure 52, the rails 56, and the structural members 53 may be assembled and secured directly on the tunnel 60. Suitable sealing may be provided to keep the battery modules 51 from being exposed to the environment (e.g., rain, snow, etc). Such a direct securement of the battery modules 51 to the tunnel 60 may improve cooling since the tunnel 60 is impinged by snow propelled by the drive track 15. Thus, heat generated by the battery modules 51 may be transferred to the tunnel 60, which is maintained at a colder temperature via the snow contacting the tunnel 60. This may also reduce part count, reduce weight of the snowmobile, and, consequently, may increase the range of the snowmobile.

In some embodiments, two or more of the structural members 53 are connected together to compress the battery modules 51 therebetween. Applying a compressive force on the battery modules 51 may hinder delamination of battery cells during charging and/or discharging, thereby improving battery cell life. As shown in FIG. 6, one or more rods 67 (only two being shown) may extend through each set of two structural members 53 and apply a compressive load on battery modules 51 therebetween. The rods 67 may be bolts having external threads that extend through the structural members 53 and couple to nuts. Alternatively or additionally, the rods 67 may be bushings having internal threads that couple to bolts extending through the structural members 53. Optionally, the rods 67 may be received within bores or holes formed in the battery modules 51, such as within frame elements of the battery modules 51, for example. The rods 67 may also or instead be external to the battery modules 51.

Referring now to FIG. 7, the battery enclosure 52 includes a cover 57 that is removably securable to the bottom panel 55. Once the battery modules 51 are secured to the bottom panel 55, the cover 57 may be placed over the battery modules 51 and secured to the bottom panel 55 using fasteners, for example, to form the complete battery enclosure 52. The cover 57 may be removed from the bottom panel 55 to access the battery modules 51 and/or other components of the battery pack 30 for maintenance purposes. In the present embodiment, the battery pack 30 includes two cleats 58 disposed over a top wall of the cover 57. Each of those two cleats 58 is suitably sized to be received within a respective one of the recesses 23A (FIG. 4) defined by the seat pan 23 of the straddle seat 22. In other words, the cleats 58 engage the recesses 23A of the seat pan 23. Although two cleats 58 are shown, more or less than two cleats 58 may be used. Each of those two cleats 58 is further secured to a respective one or more of the structural members 53 of the battery pack 30. In an alternate embodiment, both of the cleats 58 may be secured to a common structural member 53. In the present embodiment, once the cover 57 of the battery enclosure 52 is placed over the battery modules 51, the cleats 58 are bolted to the structural members 53 with the cover 57 sandwiched between the battery modules 51 and the cleats 58. In other embodiments, the cleats may be integral to the cover 57.

A load transmission path P may extend between the frame 12 and the straddle seat 22 through the structural members 53 of the battery pack 30. As shown in FIGS. 6-7, the load transmission path P extends from the tunnel 60 to the seat pan 23 via the bottom panel 55 of the battery enclosure 52, via the rails 56 secured to the bottom panel 55, via the structural members 53, and via the two cleats 58. The load transmission path P receives loads imparted by a user of the electric snowmobile 10 sitting on the straddle seat 22. These loads are transferred to the frame 12 via the battery pack 30 and, more particularly, via the structural members 53 of the battery pack 30.

Providing the load transmission path P through the structural members 53 may reduce or limit the loads imparted from the straddle seat 22 through the battery enclosure 52, including loads through the cover 57. As such, the weight and/or cost of the battery enclosure 52 may be reduced as compared to a battery enclosure that directly supports the loads from the straddle seat 22, for example. In some embodiments, providing the load transmission path P through the structural members 53 may allow for a reduced thickness and/or strength of the material forming the cover 57.

In an alternate embodiment, the straddle seat 22 may also be secured to the tunnel 60 via an exo-skeleton or structure that extends over the cover 57.

The straddle seat 22 may be secured to the tunnel 60, at least in part, by the cleats 58 and the structural members 23. As shown in FIG. 7, the cleats 58 include peripheral faces 58A extending around peripheries of the cleats 58. In the present case, each of the cleats 58 includes four peripheral faces 58A interconnected to one another. These peripheral faces 58A are in abutment against correspondingly shaped peripheral walls 23B (FIG. 4) that bound the recesses 23A of the seat pan 23. Thus, in use, movements in a longitudinal direction parallel to the central axis A and in the transverse direction T are substantially blocked or inhibited by the abutment of the peripheral faces 58A of the cleats 58 against the peripheral walls 23B that bound the recesses 23A of the seat pan 23. Herein, the expression "substantially" is meant to encompass slight movements caused by the recesses 23A being slightly bigger than the cleats 58. In some embodiments, the seat pan 23 may be fastened to the cleats 58 to further restrict or inhibit movements of the seat pan in the vertical direction V. In other words, one or more fasteners may be used to anchor down the seat pan 23 on the cleats 58. Thus, further to limit longitudinal and transverse movements of the seat pan 23 via the cleats 58, vertical movements of the seat pan 23 may be limited by the fastening of the seat pan 23 to the cleats 58. Snap fit connections between the seat pan 23 and cleats 58 may also or instead be used to further limit movements.

In other embodiments, the cleats 58 may be excluded and the seat pan 23 may be secured directly to the structural members 53 (e.g., using fasteners), with the cover 57 sandwiched therebetween.

Referring now to FIGS. 8-9, in the present embodiment, movements of the straddle seat 22 in the transverse direction T and in the vertical direction V are blocked or inhibited by the structure 80. More specifically, the straddle seat 22 is in abutment against the left bracket 84 and the right bracket 85. In the embodiment shown, the seat pan 23 includes two tabs 23C that extend forwardly toward the front end 12A of the frame 12. The two tabs 23C may be monolithically connected to a remainder of the seat pan 23. Alternatively, the two tabs 23C may be fastened to the seat pan 23.

As shown in FIG. 9, the left bracket 84 includes a first abutment face 84A facing a direction having a component in the vertical direction V and a second abutment face 84B facing a direction having a component in the transversal direction T. In the present embodiment, the first abutment face 84A is oriented downwardly toward the tunnel 60 whereas the second abutment face 84B is oriented laterally and toward the right bracket 85. The right bracket 85 has similar first and second abutment faces oriented respectively downwardly toward the tunnel 60 and laterally toward the left bracket 84. It will be appreciated that the second abutment face 84B may alternatively be oriented laterally away from the right bracket 85.

Figure 10:
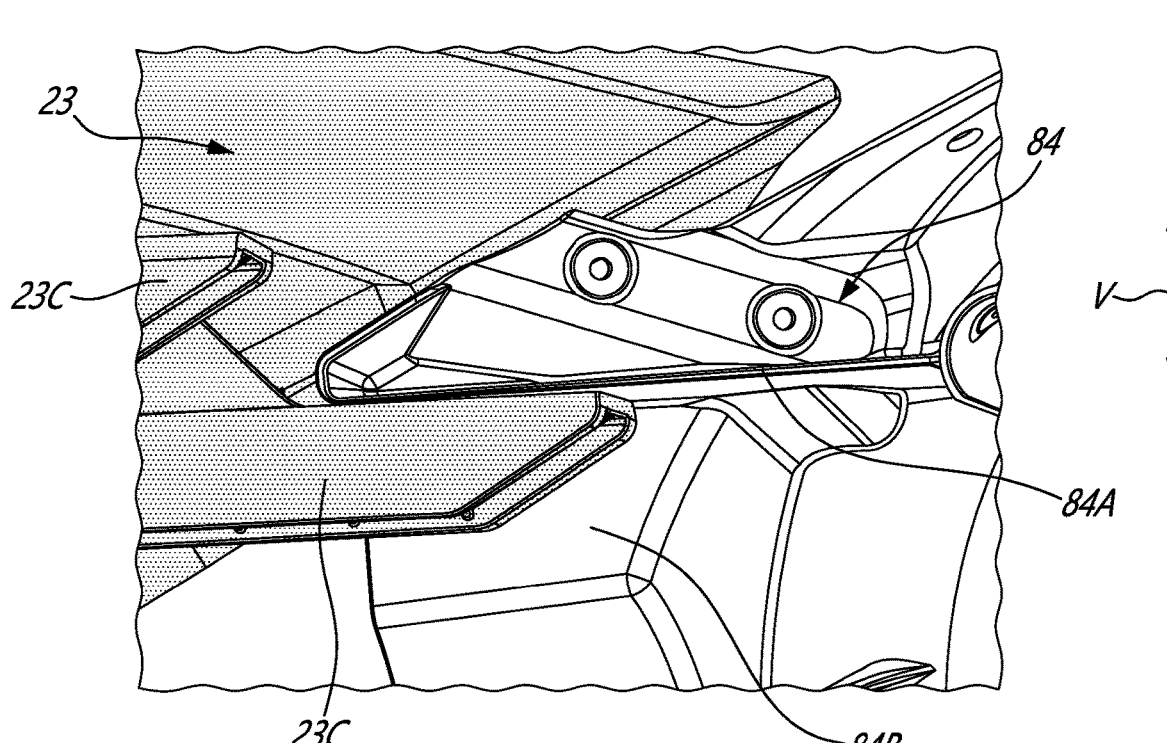
FIG. 10 is an enlarged view illustrating the seat pan engaged to the bracket of FIG. 9.

Referring now to FIG. 10, one of the tabs 23C of the seat pan 23 is shown engaged to the left bracket 84. As illustrated, the tab 23C is in abutment against both of the first abutment face 84A and against the second abutment face 84B. Similarly, the other of the tabs 23C is in abutment against the first and second abutment faces of the right bracket 85 (not shown in FIG. 10). Thus, movements of the seat pan 23 in the vertical direction V away from the tunnel 60 are blocked or inhibited by the first abutment faces 84A of the left bracket 84 and of the right bracket 85 that are disposed over the tabs 23C. Lateral movements of the seat pan 23 in the transverse direction T are blocked or inhibited by the second abutment faces 84B of the left bracket 84 and of the right bracket 85 abutting the tabs 23C. Herein, the two tabs 23C are disposed between the left and right brackets 84, 85.

The disclosed configuration may provide structural support for the straddle seat 22 without the need for a structural battery enclosure. The attachment mechanism, which includes the cleats 58 and the brackets 84, 85 of the structure 80 may allow for easy removal of the straddle seat if need be.

Figure 11:
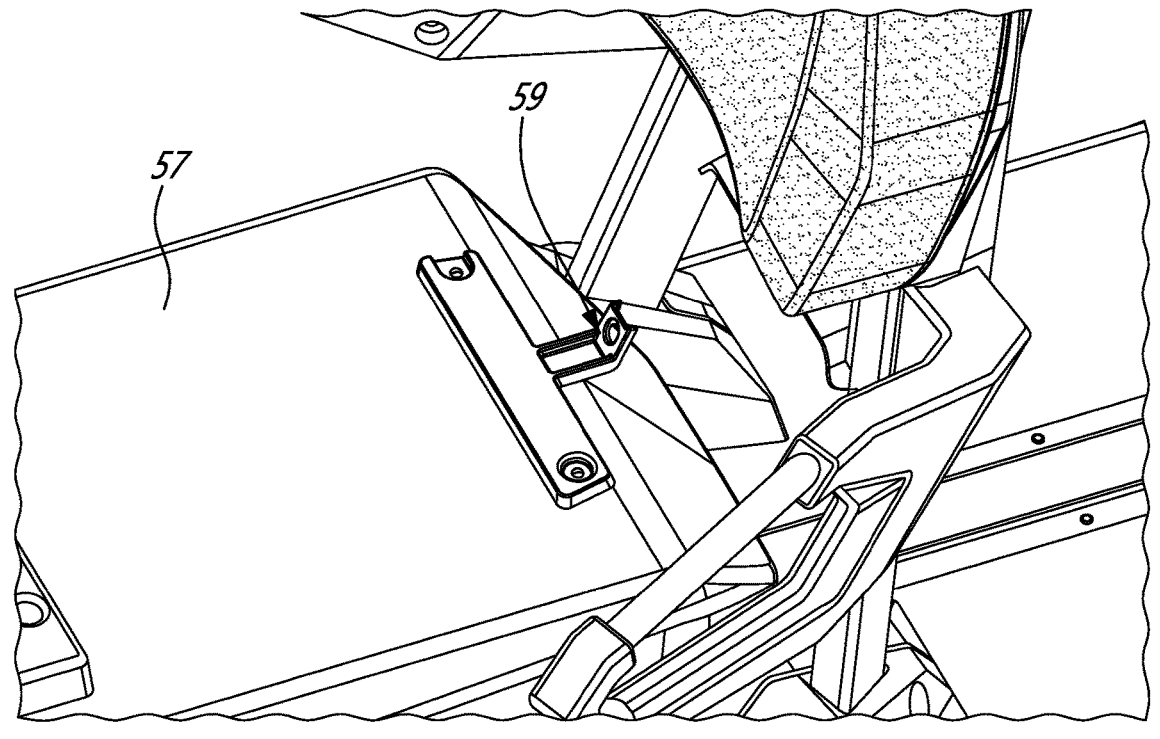
FIG. 11 is a top three dimensional view showing a rear section of the battery pack of the electric snowmobile of FIG. 1.
Figure 12:
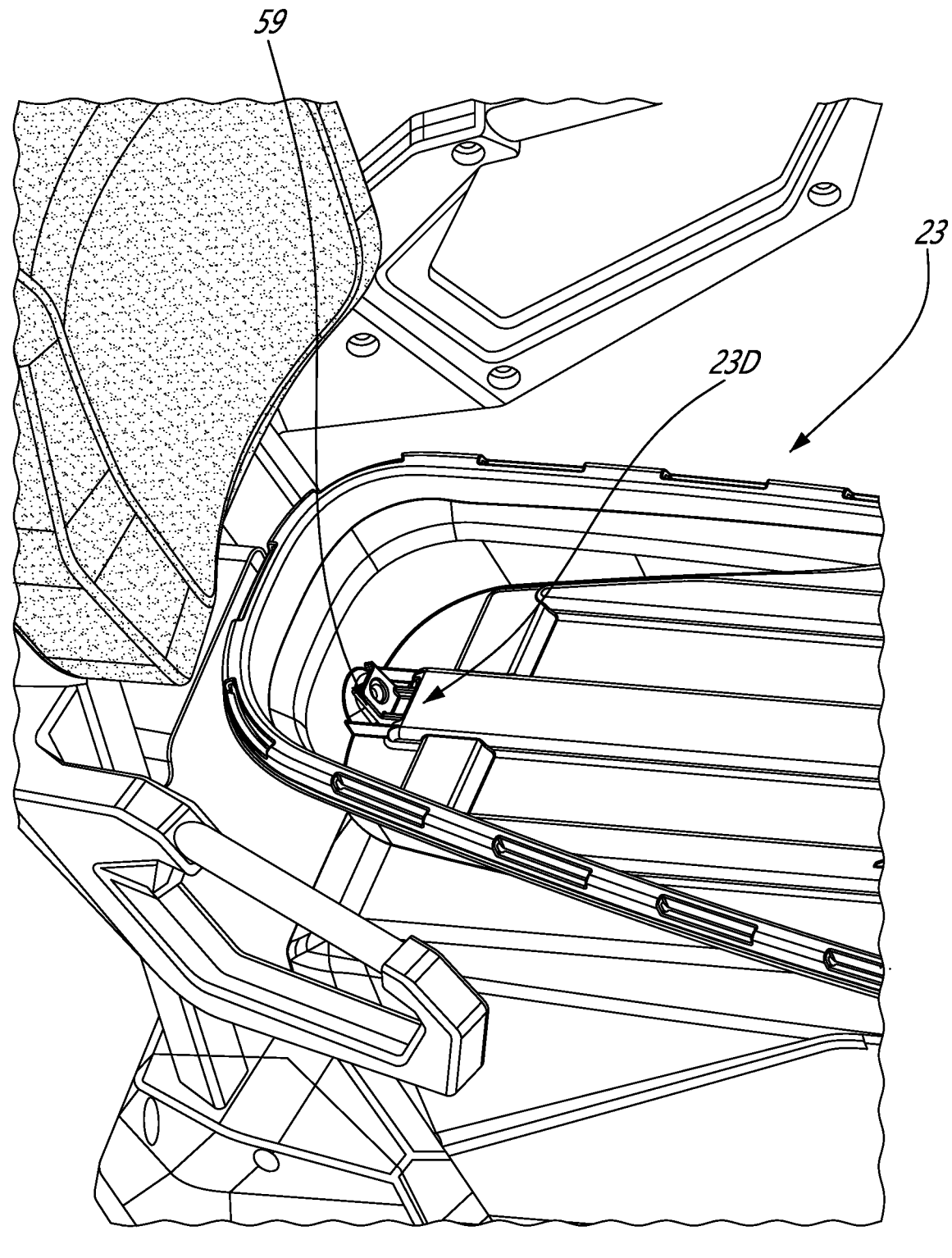
FIG. 12 is a top three dimensional view illustrating the seat pan and the backrest of FIG. 9.

Referring now to FIGS. 11-12, a hook 59 is secured to the battery pack 30. The hook 59, which may also or instead be a tab or flange, includes a mounting plate or bracket to connect to the battery pack 30 via fasteners and/or adhesive, for example. In some embodiments, the hook 59 is secured to a back end of the cover 57 of the battery enclosure 52. The hook 59 may also or instead be secured to one of the structural members 53 of the battery pack 30 through the cover 57 (e.g., a rearmost of the structural members 53).

As shown in FIG. 12, the hook 59 is sized to be received within an aperture 23D defined at a rear end of the seat pan 23. The hook 59 defines a threaded aperture that may receive a correspondingly threaded bolt. The threaded bolt may be inserted through another aperture defined through the seat pan 23 until it is received within the threaded aperture of the hook 59. A portion of the seat pan 23 will thus become sandwiched between a head of the threaded bolt and the hook 59. The rear end of the seat pan 23 may thus be fastened on the rear end of the cover 57. The hook 59 combined with the threaded bolt received through the threaded aperture limits movements of the seat pan 23. More specifically, the hook 59, by its shape, may limit rearward movements of the seat pan 23 along the longitudinal axis and may limit lateral movements of the rear end of the seat pan 23 along the transverse direction T. The threaded bolt received through the threaded aperture 23D may limit movements of the seat pan 23, more particularly of the rear end of the seat pan 23, along the vertical direction V. In this way, the hook 59 may secure the straddle seat 22 to the battery pack 30. Further, the hook 59 may secure the straddle seat 22 to the frame 12 via bottom panel 55 of the battery enclosure 52, via the rails 56 secured to the bottom panel 55, and/or via the structural members 53. Loads from the straddle seat 22 may also be transferred to the frame 12 via the hook 59 and/or via the structural members 53. In some embodiments, there may be two or more hooks each having a threaded aperture for receiving a threaded bolt; the two or more hooks being located on opposite sides of the rear end of the seat pan 23.

To remove the seat pan 23, a user may remove the threaded bolt to free the rear end of the seat pan 23. The rear end of the straddle seat 22 may thus be lifted upwardly along the vertical direction V and pulled longitudinally rearward along the longitudinal axis L to disengaged the seat pan 23 from the cleats 58 (FIG. 7) and to disengage the tabs 23C from the brackets 84, 85 (FIG. 10). To install the straddle seat 22, the user moves the straddle seat 22 along the longitudinal axis L until the tabs 23C are in abutment against the abutment faces of the left and right brackets 84, 85, lowers the rear end of the straddle seat 22 by pivoting the straddle seat 22 about an axis being transverse to the longitudinal axis and intersecting the tabs 23C until the hook 59 is received through the aperture 23D. At which point, the threaded bolt may be threadingly engaged to the hook 59 to prevent any undesired vertical motion of the rear end of the straddle seat 22.

Figure 13:
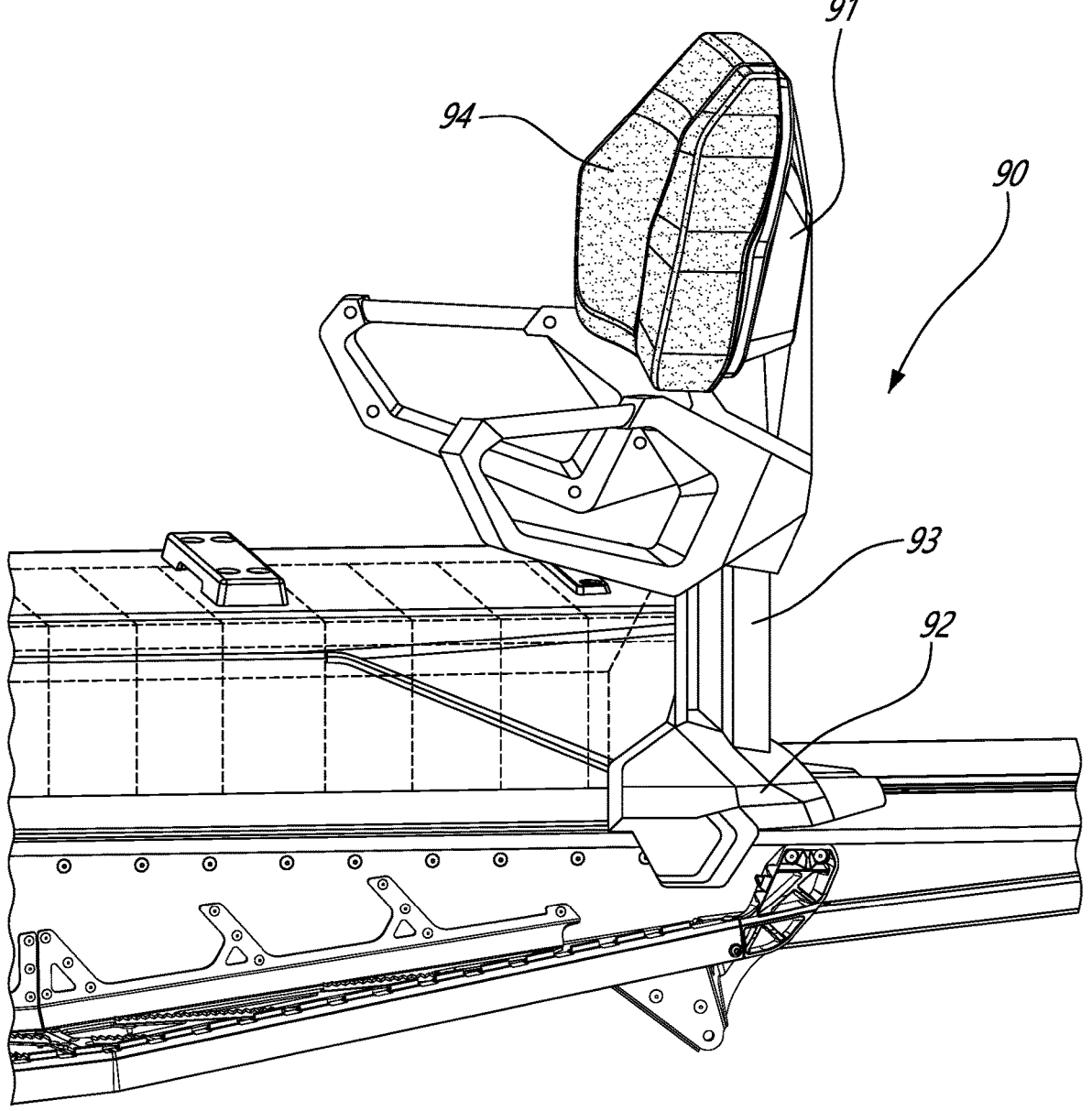
FIG. 13 is a side three dimensional view illustrating a backrest of the electric snowmobile of FIG. 1.

Referring now to FIG. 13, the electric snowmobile 10 includes a back rest 90 disposed rearward of the battery pack 30. In the embodiment shown, the back rest 90 is secured to the tunnel 60. The back rest 90 includes a top section 91 for supporting a back of a user, a base section 92 secured to the tunnel 60, and a pillar section 93 connecting the top section 91 to the base section 92. A cushion 94 may be secured to the top section 91 for comfort. The top section 91, the base section 92, and the pillar section 93 may all be monolithically connected to one another. Alternatively, they may be separate components suitably secured to one another. The pillar section 93 is vertically aligned with the battery pack 30. The pillar section 93 may be in contact against a rear end of battery pack 30.

Referring now to FIG. 14, another embodiment of the backrest 190 is shown in greater detail. As illustrated, the pillar section 193 includes two rear beams 193A and two front beams 193B. The front beams 193 extend forwardly of a rear wall of the battery pack 30. The rear and front beams 193A, 193B stem from a transversal beam 193C. The top section 191 is secured to the pillar section 193 via the transversal beam 193C. More specifically, the top section 191 includes two vertical beams 191A each being secured to and extending upwardly from the transversal beam 193C of the pillar section 193. Arm rests 194 are secured to both of the top section 191 and the two front beams 193B. The base section 192 includes two base brackets 192A. Each of the two base brackets 192A is secured to a respective one of the two rear beams 193A and to a respective one of the two front beams 193B. The two base brackets 192A extend longitudinally relative to the longitudinal axis A and parallel to the tunnel 60. The two base brackets 192A are secured to the tunnel 60. More specifically, each of the two base brackets 192A may be secured to a respective one of the two side panels 62 (FIG. 3) of the tunnel 60. Each of the two base brackets 192A defines two securing locations 192B longitudinally spaced apart from one another via which the base brackets 192A are secured to the tunnel 60. Thus, the backrest 190 is secured to the tunnel at four locations, two on each side of the battery pack 30. The base brackets 192A of the backrest 190 may be secured to the tunnel via any suitable mechanical fastener, such as via nuts and bots, rivets or a quick-connect fastening mechanism, among other possibilities. The backrest 190 may be positioned such that the transversal beam 193C is positioned rearwardly of a rear wall of the battery pack 30. Alternatively, the backrest 190 may straddle the battery pack 30 such that the transversal beam 193C is positioned above the cover 57.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:
1. An electric recreational vehicle, comprising:
a frame extending along a longitudinal axis between a front end and a rear end of the frame;
an electric motor mounted to the frame;
a battery pack mounted to the frame and disposed at least partially rearward of the electric motor relative to the longitudinal axis, the battery pack including:
one or more battery modules operatively connected to the electric motor for supplying electrical energy to the electric motor,
a battery enclosure containing the one or more battery modules, and
at least one structural member located within the battery enclosure and delimiting at least one module-receiving section, the one or more battery modules located within the at least one module-receiving section; and
a seat disposed over the battery pack, a load transmission path extending between the frame and the seat through the at least one structural member of the battery pack.
2. The electric recreational vehicle of claim 1, wherein the at least one structural member includes two structural members connected together to compress the one or more battery modules therebetween.

3. The electric recreational vehicle of claim 1, wherein the seat is secured to the at least one structural member of the battery pack.

4. The electric recreational vehicle of claim 1, wherein the battery enclosure includes a bottom panel secured to the frame, the at least one structural member including a plurality of structural members secured to the bottom panel and longitudinally distributed about the longitudinal axis, the structural members being transverse to the bottom panel.

5. The electric recreational vehicle of claim 4, wherein the battery enclosure includes a cover disposed over the one or more battery modules, at least one cleat disposed on a top panel of the cover, the at least one cleat secured to the at least one of the structural members, the load transmission path extending through the at least one cleat.

6. The electric recreational vehicle of claim 5, wherein the seat includes at least one recess sized to accept the at least one cleat, the at least one cleat engaging the at least one recess to inhibit movements of the seat along a longitudinal direction parallel to the longitudinal axis and along a transverse direction perpendicular to the longitudinal axis.

7. The electric recreational vehicle of claim 6, wherein the at least one cleat and the at least one recess includes two cleats and two recesses axially spaced apart from one another relative to the longitudinal axis.

8. The electric recreational vehicle of claim 1, wherein the frame includes a tunnel at least partially enclosing a space receiving a drive track, the battery pack disposed over the tunnel and secured to the tunnel, the seat secured to the tunnel via the battery pack, the load transmission path extending from the tunnel to the seat through the at least one structural member of the battery pack.

9. The electric recreational vehicle of claim 8, wherein the frame includes a sub-frame disposed forward of the tunnel relative to the longitudinal axis, the frame including a structure disposed over the sub-frame, movements of the seat in a transverse direction perpendicular to the longitudinal axis and in a vertical direction perpendicular to both of the transverse direction and the longitudinal axis inhibited by the structure.

10. The electric recreational vehicle of claim 9, wherein the structure includes two front legs secured to front suspensions and two rear legs secured to the tunnel, the structure including two brackets each secured to a respective one of the two rear legs, the seat in abutment against the two brackets.

11. The electric recreational vehicle of claim 10, wherein the two brackets define first abutment faces facing a lateral direction transverse to the longitudinal axis and second abutment faces facing the vertical direction transverse to both of the longitudinal axis and the lateral direction, the seat having two tabs protruding along the longitudinal axis from a forward end of the seat, each of the two tabs in abutment against both of a respective one of the first abutment faces and a respective one of the second abutment faces.

12. The electric recreational vehicle of claim 11, wherein the two tabs are monolithically connected to a body of a seat pan of the seat.

13. The electric recreational vehicle of claim 1, comprising a hook secured to a rear end of the battery pack, the hook engaging the seat.

14. The electric recreational vehicle of claim 13, wherein the hook is secured to the at least one structural member.

15. The electric recreational vehicle of claim 1, wherein the electric recreational vehicle is one of a snowmobile and a personal watercraft.

16. An electric recreational vehicle, comprising:
a frame extending along a longitudinal axis between a front end and a rear end of the frame;
an electric motor mounted to the frame;
a battery pack mounted to the frame and disposed at least partially rearward of the electric motor relative to the longitudinal axis, the battery pack including:
one or more battery modules operatively connected to the electric motor for supplying electrical energy to the electric motor,
a battery enclosure containing the one or more battery modules, and
at least one structural member located within the battery enclosure and delimiting at least one module-receiving section, the one or more battery modules located within the at least one module-receiving section; and
a seat disposed over the battery pack, the seat secured to the frame via the at least one structural member.

17. The electric recreational vehicle of claim 16, wherein the battery enclosure includes a cover disposed over the one or more battery modules, at least one cleat disposed over a top panel of the cover, the at least one cleat secured to the at least one structural member.

18. The electric recreational vehicle of claim 17, wherein the seat includes at least one recess sized to accept the at least one cleat, the at least one cleat engaging the at least one recess to inhibit movements of the seat along a longitudinal direction parallel to the longitudinal axis and along a transverse direction perpendicular to the longitudinal axis.

19. The electric recreational vehicle of claim 16, comprising a hook secured to a rear end of the battery pack, the hook engaging the seat.

20. The electric recreational vehicle of claim 19, wherein the hook is secured to the at least one structural member.

21. An electric recreational vehicle, comprising:
a frame extending along a longitudinal axis between a front end and a rear end;
an electric motor mounted to the frame;
a battery pack mounted to the frame, the battery pack including
one or more battery modules operatively connected to the electric motor for supplying electrical energy to the electric motor,
a battery enclosure containing the one or more battery modules, and
at least one structural member located within the battery enclosure and applying compression to the one or more battery modules; and
a seat disposed over the battery pack, a load transmission path extending between the frame and the seat through the at least one structural member of the battery pack.

* * * * *